Patented May 25, 1943

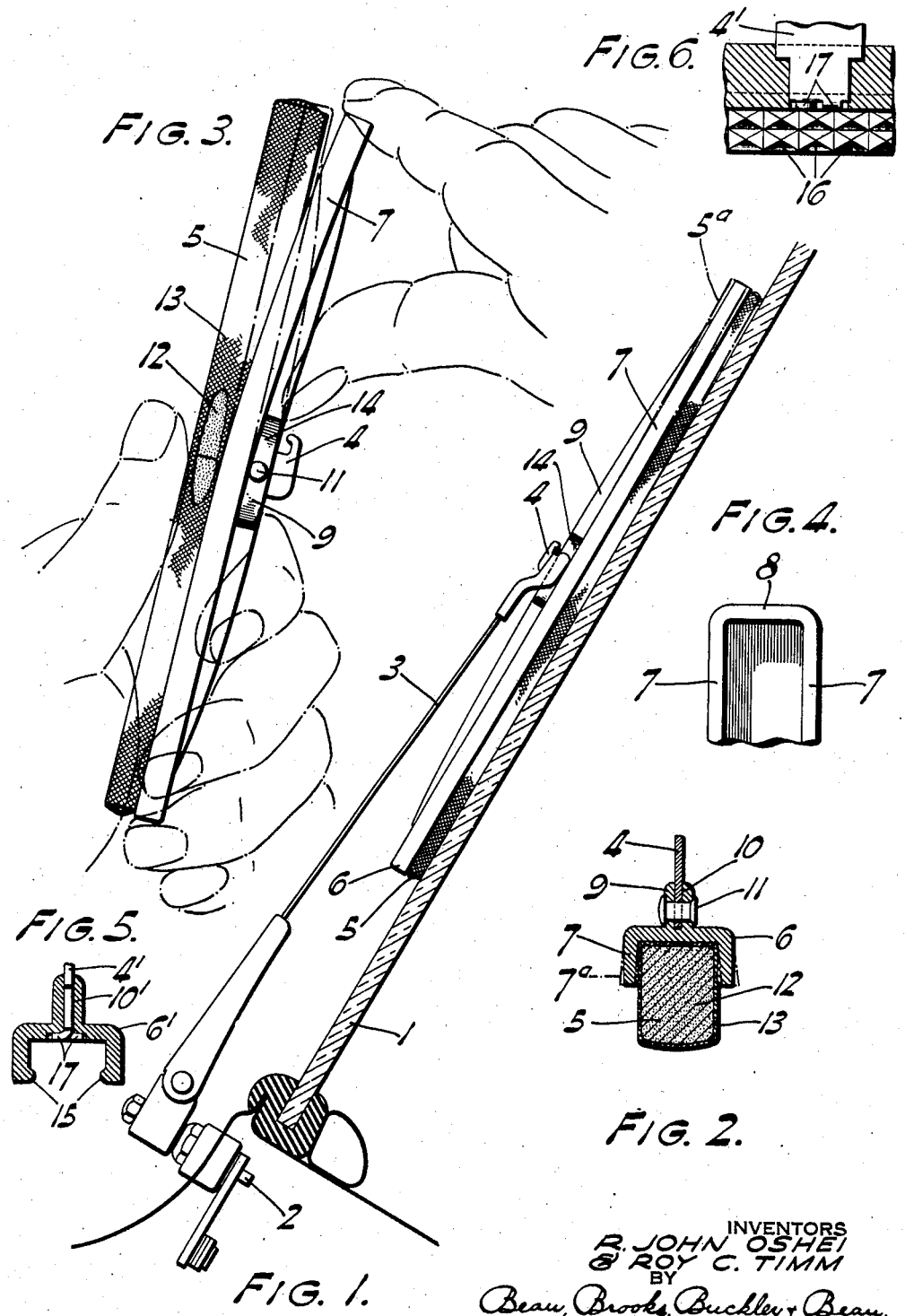

2,319,904

UNITED STATES PATENT OFFICE 2,319,904

SLEET BLADE

Reed John Oshei and Roy C. Timm, Buffalo, N. Y., assignors to Trico Products Corporation, Buffalo, N. Y.

Application November 10, 1939, Serial No. 303,810

4 Claims. (Cl. 15—250.3)

This invention relates to the art of cleaners for the windshields of motor vehicles and more particularly the wiping element or blade which is detachably connected to its actuating arm for replacement as the occasion may arise.

It has heretofore been the custom to discard the wiping blade as an entirety when it became necessary to renew the wiping edge. This practice has arisen due to the fabrication of the blade which consisted of a rubber wiping edge and a metallic holder therefor. After long usage the rubber would oxidize and the holder rust or otherwise become impaired.

An object of the present invention is to provide a wiper in which the holder is serviceable indefinitely and the wiping element alone renewable in a practical and ready manner. A further object is to provide a wiper which is efficacious in the removal of snow and ice by the application of an anti-freeze substance, such substance being contained in a handy form which is conveniently renewable and replaceable in the holder.

In the drawing showing one embodiment of the invention

Fig. 1 is a fragmentary sectional view through a vehicle windshield depicting the improved wiper mounted thereon;

Fig. 2 is a transverse sectional view of the wiper;

Fig. 3 illustrates the manner of replacing the wiping element in the holder;

Fig. 4 is a fragmentary view of one end of the holder; and

Figs. 5 and 6 are sectional views depicting modified showings of the molded plastic holder.

Referring more particularly to the drawing, the numeral 1 designates the windshield glass, and 2 the actuating shaft for the wiper carrying arm 3.

The wiper, which is removably connected to the outer end of the arm 3 by an attaching fin or clip 4, comprises a wiping element 5 and a holder 6 therefor. The holder is molded of plastic, such as a synthetic resin, and is possessed of a predetermined inherent resiliency sufficient to enable a certain amount of flexure in the side walls as well as lengthwise of the molded plastic body. The resilient flexure of the side walls 7 is taken advantage of in providing for a firm frictional embrace of the wiping element 5, which latter is slightly overdimensioned so as to require its being press fitted or forced into the pocket or channel, as defined by the side walls, and effect a slight spreading apart of the latter, as indicated at 7a on an exaggerated scale. In this connection it will be observed from Fig. 4 that the side walls 7 are joined across their opposite ends by curved end walls 8 which form therewith an elongated pocket having a continuous wall about the wiping element in snug embrace with the same.

When it becomes necessary to replace the worn wiping element the holder is grasped somewhat as indicated in Fig. 3 and flexed lengthwise. This flexing movement breaks the firm grip of the side walls and any adhesion between the parts, so that the adjacent end of the wiping element will project for being readily grasped by the hand and pulled out of the elongated pocket of the holder. Thereafter a new element is pressed into the holder pocket and the wiper again connected to its arm. This flexibility in the holder is also beneficial in permitting the wiping edge to accommodate for irregularities and unevenness in the glazed surface since the wiper will yield, as at 5a, under sufficient pressure from the spring carrying arm 3, to conform the wiping edge to the irregular contour of the surface.

The lengthwise resiliency in the holder is confined primarily to the opposite end portions by means of a strengthening rib 9 on the back thereof. This rib is molded integrally with the channeled body and is attenuated toward the opposite ends so as to diminish its reinforcing effect progressively.

The attaching fin 4 is located substantially midway of the length of the blade where the reinforcement from the rib is greatest and may be formed separately, as from sheet metal, and securely embedded in the plastic body during the molding thereof or subsequently inserted in the preformed seat 10 and anchored by a transverse fastener 11. The back rib 9 may be thickened about the anchorage for the attaching fin as shown at 14 so as to give better lateral support for the fin.

The wiping element may be of waterproof material for removing rain from the windshield, or it may be chemically treated with an anti-freeze compound for the removal of ice and other matter deposited thereon. For the latter purpose the element may comprise one or more salt bars or sticks 12 enclosed within a fabric container or sack 13. Upon becoming wet the chemical substance will dissolve and spread itself on the surface being wiped. By reason of the flexible characteristic of the holder the adhesion between the latter and the salt element may readily be broken for renewal purposes.

To more firmly secure the chemical bar with its enveloping fabric container 13 within the channel or pocket, the plastic holder 6', Fig. 5, may be provided with internal bead-like projections 15, or the inner walls may be knurled to provide minute pointed projections 16, Fig. 6, to interengage with the chemical bar. When the salt becomes wet and again dries this interlock will maintain because the spring pressure of the arm 3 will force the wet bar firmly into the pocket and about the projections for the subsequent drying. The interlock is sufficient to normally hold the chemical element within the pocket but the projections are relatively small to permit the holder being readily flexed for breaking the adhesion with a practically depleted bar.

The plastic holder body maintains its polished appearance and is unaffected by weather or climatic conditions. It therefore makes an ideal holder for renewable inserts which are easily replaced to restore the wiping element to its original efficiency. While the foregoing description has been given in detail it is obvious that the inventive principles may assume other physical embodiments without departing from the scope or spirit of the invention claimed.

What is claimed is:

1. A windshield wiper comprising a wiping element embodying a corrosive anti-freeze chemical, a molded plastic holder therefor of synthetic resin having a centrally disposed longitudinal rib on its back attenuating toward the ends of the holder to render the end portions more flexible than the intermediate portion, and an arm-attaching clip projecting from the rib.

2. A windshield wiper comprising an elongated molded plastic holder having a pocket, and a water soluble wiping element of bar-like form having a pressed fit in the pocket, the holder having means intermediate its ends for strengthening such portion against flexing while leaving one of its end portions relatively more flexible for being flexed away from the wiping element.

3. A windshield wiper comprising a wiping element, a molded plastic holder therefor having a centrally disposed rib on its back attenuating in opposite directions from a central portion which latter is formed with a recess, and an arm attaching clip anchored in the recess and projecting from the rib, the molded plastic rib being thickened about the recess to give lateral support to the attaching clip.

4. A holder for a wiping element which embodies a de-icing chemical, comprising an elongated channeled body molded with resilient element-embracing side walls from synthetic resin, a back rib for the central portion of the holder molded therewith and gradually tapering off into the body toward the opposite ends but short thereof to provide a sturdy central portion with the end portions possessing a relatively greater flexibility to enable either end portion being flexed about a transverse axis for breaking any adhesion between the side walls and an embraced element.

R. JOHN OSHEI.
ROY C. TIMM.